United States Patent
Chiu et al.

(10) Patent No.: US 8,195,096 B2
(45) Date of Patent: Jun. 5, 2012

(54) APPARATUS AND METHOD FOR ENHANCING DC OFFSET CORRECTION SPEED OF A RADIO DEVICE

(75) Inventors: Chinq-shiun Chiu, Hsinchu (TW); Shou-tsung Wang, Sinying (TW)

(73) Assignee: Mediatek Inc., Hsin-Chu (TW)

( * ) Notice: Subject to any disclaimer, the term of this patent is extended or adjusted under 35 U.S.C. 154(b) by 1469 days.

(21) Appl. No.: 11/457,362

(22) Filed: Jul. 13, 2006

(65) Prior Publication Data

US 2008/0026719 A1 Jan. 31, 2008

(51) Int. Cl.
*H04B 15/00* (2006.01)

(52) U.S. Cl. .................. 455/63.1; 455/114.2; 455/296; 330/259; 330/270

(58) Field of Classification Search .......... 455/296, 455/278.1, 63.1, 67.13, 114.2, 286, 307, 455/424, 425, 456.5, 456.6, 561, 550.1, 575.1, 455/306, 283, 249.1; 327/427, 157, 307, 327/552, 554; 330/152, 51, 17.1, 107; 333/17.1
See application file for complete search history.

(56) References Cited

U.S. PATENT DOCUMENTS

| | | | | |
|---|---|---|---|---|
| 3,389,346 A | * | 6/1968 | Webb | 330/51 |
| 5,084,683 A | * | 1/1992 | Nicollini | 330/107 |
| 6,069,505 A | * | 5/2000 | Babanezhad | 327/156 |
| 6,114,980 A | | 9/2000 | Tilley et al. | |
| 6,335,656 B1 | | 1/2002 | Goldfarb et al. | |
| 6,356,217 B1 | * | 3/2002 | Tilley et al. | 341/118 |
| 6,452,444 B1 | * | 9/2002 | Mehr | 327/554 |
| 6,516,187 B1 | * | 2/2003 | Williams et al. | 455/313 |
| 6,771,945 B1 | * | 8/2004 | Pickett et al. | 455/324 |
| 6,784,728 B2 | * | 8/2004 | Fischer | 327/554 |
| 6,927,722 B2 | * | 8/2005 | Hong | 341/172 |
| 6,975,845 B2 | * | 12/2005 | Vihonen et al. | 455/249.1 |
| 7,339,442 B2 | * | 3/2008 | Godambe | 331/135 |
| 7,403,760 B1 | * | 7/2008 | Gao | 455/312 |
| 7,495,508 B2 | * | 2/2009 | Tan | 327/554 |
| 7,899,431 B2 | * | 3/2011 | Rahman et al. | 455/324 |
| 2003/0231054 A1 | * | 12/2003 | Magoon et al. | 330/9 |
| 2004/0169565 A1 | * | 9/2004 | Gaggl et al. | 333/17.1 |
| 2005/0162219 A1 | * | 7/2005 | Adan | 327/552 |
| 2005/0225388 A1 | * | 10/2005 | Ramachandran et al. | 330/150 |
| 2006/0009182 A1 | * | 1/2006 | Yoneda et al. | 455/234.1 |
| 2006/0071838 A1 | * | 4/2006 | Runals et al. | 341/155 |
| 2006/0091933 A1 | * | 5/2006 | Makino et al. | 327/427 |
| 2007/0063757 A1 | * | 3/2007 | Bouras | 327/307 |
| 2007/0090863 A1 | * | 4/2007 | Hsu | 327/157 |

FOREIGN PATENT DOCUMENTS

| | | |
|---|---|---|
| TW | 200410532 | 6/2004 |
| TW | 200501602 | 1/2005 |

* cited by examiner

*Primary Examiner* — Duc Nguyen
*Assistant Examiner* — Charles Chow
(74) *Attorney, Agent, or Firm* — Thomas|Kayden

(57) ABSTRACT

The instant invention relates to an apparatus and method for enhancing DC offset correction speed of a radio device. On the exemplary, the apparatus includes one or two-stage signal-processing units and a controller. Each signal-processing unit has a baseband filter, a gain stage and a DC offset correction (DCOC) loop applied on the gain stage. A connection direction of an electrode terminal of a capacitor of the baseband filter is capable of being switched by the controller to process a pre-charge or a discharge phases thereby adjusting a bandwidth of the baseband filter to be either a normal operational bandwidth or wider than the normal operational bandwidth for rapidly setting time of the baseband filter.

37 Claims, 13 Drawing Sheets

APPARATUS AND METHOD FOR ENHANCING DC OFFSET CORRECTION SPEED OF A RADIO DEVICE

BACKGROUND OF INVENTION

1. Field of the Invention

The present invention relates an apparatus and method, and especially in an apparatus and method for enhancing DC offset correction speed of a radio device.

2. Description of the Prior Art

As known, in a radio device based on a radio communication architecture, such as a direct conversion radio receiver (DCR) or Zero IF (ZIF), a DC offset manner frequently occurs during a process of mixing a RF or IF signal with a local oscillating signal to be a baseband signal used for the radio device. Because the radio receiver needs to keep a capability of receiving signal on movements, a frequency of the baseband signal will become higher or lower, and each gain in the radio receiver will be properly readjusted or re-corrected in response to this manner. The readjusted gain will result in changes of DC offset. While a DC offset occurs, the received baseband signal therefore may be distorted, especially through an amplifier, or a baseband filter that is saturated to make the radio device inoperable. Therefore, it is an extreme important for a radio device to provide a DC offset correction or cancellation for resolving a DC offset again after gain setting.

In an exemplar of using a GSM or current mobile phone system, a time slot for the radio receiver is being progressed for only a period of 20~30 μs, which has been decided by a standard communication specification like a TDMA (Time division Multiple Access) system. During a time slot between receivers, only a very-short time is permitted to perform a DC offset correction after gain setting and continuously receive the baseband signal at the same time. However, it is a preliminary issue of how to perform a DC offset correction within such an instant or transient time.

For foregoing problems, a DC offset correction loop (DCOC Loop) is proposed in U.S. Pat. No. 6,114,980, which adopts a sign bit generator 204, a search stage 206 and a digital-to-analog converter 208 to compensate for input of a gain stage 202 like a baseband filter or an amplifier. Practically, at each time the loop 200 always need take 10 μs perform sequential comparison. And, a bandwidth of the gain stage, such as a baseband filter, on its signal-pass path, (e.g. GSM system) has a cannel bandwidth of 200K, which limits the whole DC offset correction speed of the radio receiver 100. Thus, a response time of the loop may be easily delayed from its baseband filter.

An U.S. Pat. No. 6,356,217 as illustrated in FIG. 1 of the present specification, discloses a radio receiver 100 disposed with a DC offset correction loop (DCOC Loop) that adopts a processor 160 to control a filter's bandwidth variance and clock speed. As shown in FIG. 2 of the present specification, a binary search is accomplished at a higher clock rate by way of raising a bandwidth of a baseband filter 130 at 3 dB corner frequency. After the DC correction is established, the baseband filter 130 is reset to a normal-operating statue by adjusting its corner frequency from higher to lower. However, as step 224 in FIG. 2 of the present specification, the filter bandwidth reset needs a setting time depended on support of a voltage potential. A lower voltage potential will result in a longer setting time for the filter 130. Therefore, it is an important topic of how to achieve a rapid setting time of a baseband filter within an allotted time slot for a radio device. Beside according to the DC offset loop 200, a PGA 124 will firstly amplify DC offset of the baseband signal, prior to filtering of the baseband filter 130, and then the baseband filter 130 with gain further increases DC offset by itself.

An U.S. Pat. No. 6,335,656 as illustrated in FIG. 3 of the present specification, discloses that a low noise filter (LPF) 24 is put in a feedback path to an amplifier 22 to perform a high pass filter 20 for DC cancellation. Meanwhile, multi-resistors are switched to vary 3 dB corner frequency of the filter 24. In an initial phase as a pre-charging phase, a resistance-smaller resistor is to set a higher 3 dB corner frequency for faster DC offset cancellation, and also providing a larger current to a pre-charged capacitor C. Alternatively in a normal-operating phase, a resistance-larger resistor is to set a lower 3 dB corner frequency and provide a moderate current. However, such a design is more complicated and occupies more layout area.

SUMMARY OF INVENTION

To solve the forgoing drawbacks, it therefore is a primary objective of the present invention to provide an apparatus and method for enhancing DC offset correction speed of a radio device.

It is a secondary object of the present invention to provide an apparatus and method that controls a pre-charged capacitor to set a preset voltage potential thereby reducing a settle time of a baseband filter.

It is a third object of the present invention to provide an apparatus with a simplified configuration so as to reduce both an occupied area and component cost.

To archive the forgoing objectives, the instant invention discloses an apparatus for enhancing DC offset correction speed of a radio device. On the exemplary, the apparatus is defined with one or two-stage signal-processing units and a controller. Meanwhile, Each signal-processing unit has a baseband filter, a gain stage and a DC offset correction (DCOC) loop applied on the gain stage. The baseband filter has a bandwidth-controlling unit, a capacitor section, a resistor section and an operational amplifier. A connection direction of an electrode terminal of a capacitor disposed within the capacitor section is capable of being switched by the controller to process a pre-charge or discharge phases thereby adjusting a bandwidth of the baseband filter to be either a normal operational bandwidth, i.e. 150 K, or wider than the normal operational bandwidth, i.e. 5 MHz, thereby rapidly outputting a baseband signal.

Beside, the instant invention discloses a method for enhancing DC offset correction speed of said radio device, according to the present invention, comprising the following steps of:

switching a first capacitor of a first baseband filter to connect with a reference DC voltage source to proceed a pre-charge procedure of the first capacitor thereby adjusting the bandwidth of the first baseband filter to be wider than a normal operational bandwidth;

implementing a first DC offset correction loop to eliminate a DC offset of an output signal of a first signal processing unit;

after the first capacitor is pre-charged to reach a preset voltage level, switching the first capacitor of the first baseband filter to connect with a normal-operating point of a first operational amplifier thereby adjusting the bandwidth of the first baseband filter to be a normal operational bandwidth; and implementing a second DC offset correction loop to eliminate a self-mix DC offset of an output signal of a second signal processing unit.

DETAILED DESCRIPTION

Figure 1:
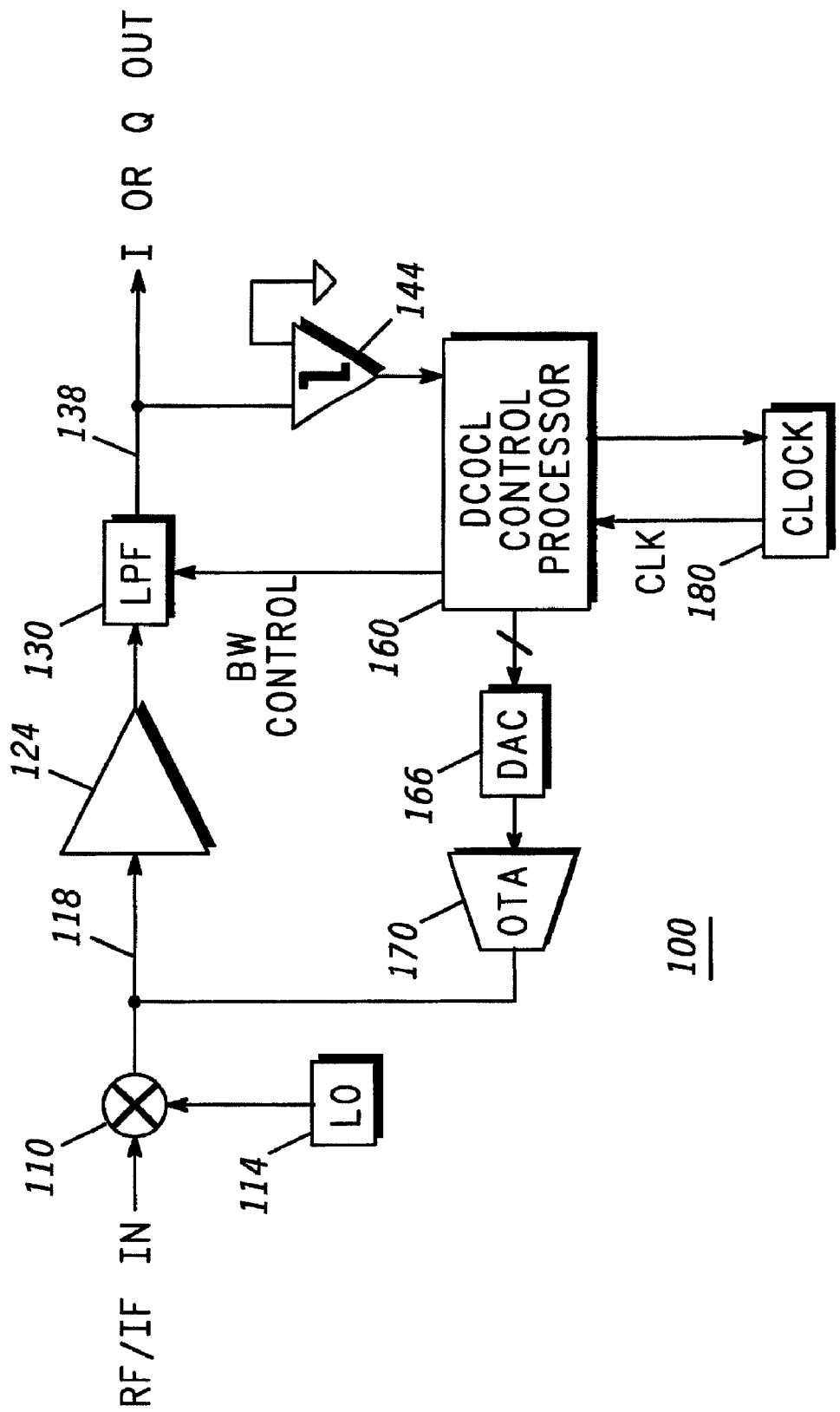
FIG. 1 illustrates a schematic diagram of a conventional radio device with DC offset correction loop.
Figure 2:
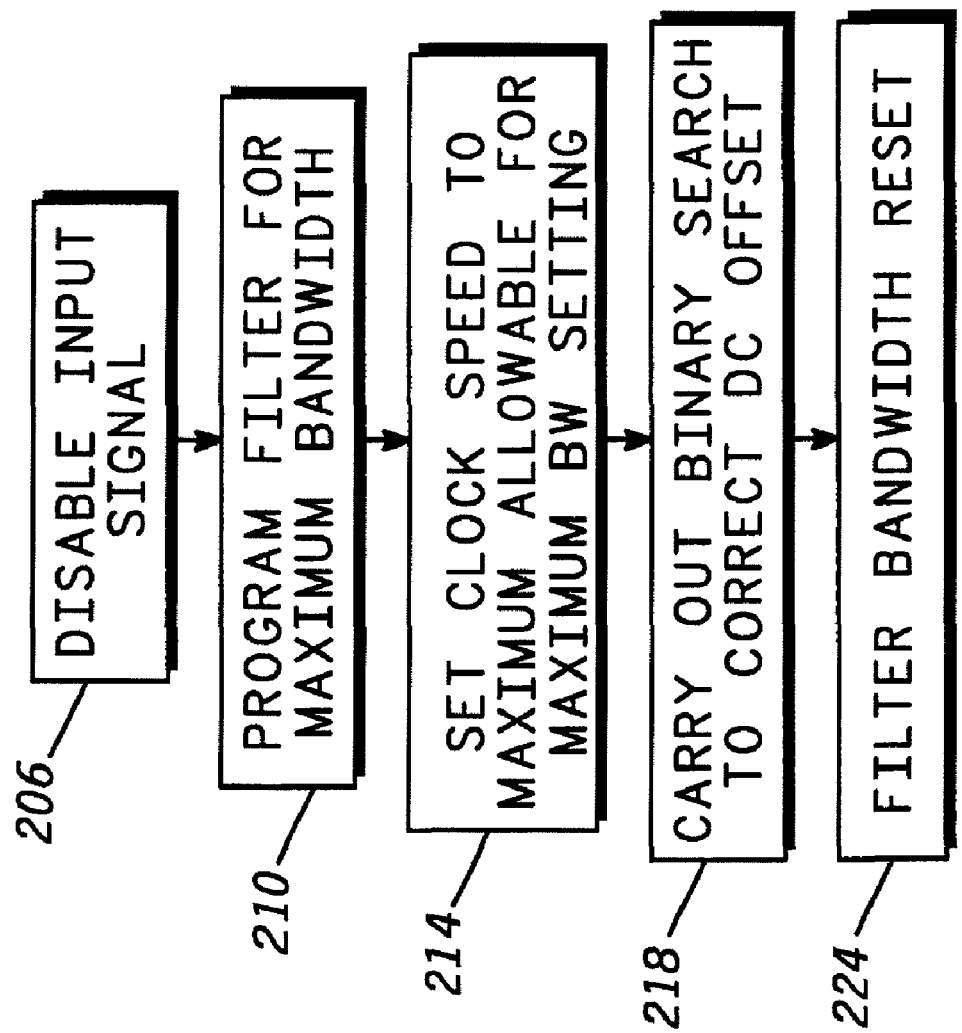
FIG. 2 illustrates a flow chart of a method for performing DC offset correction of a radio device according to the prior art as shown in FIG. 1.
Figure 3:
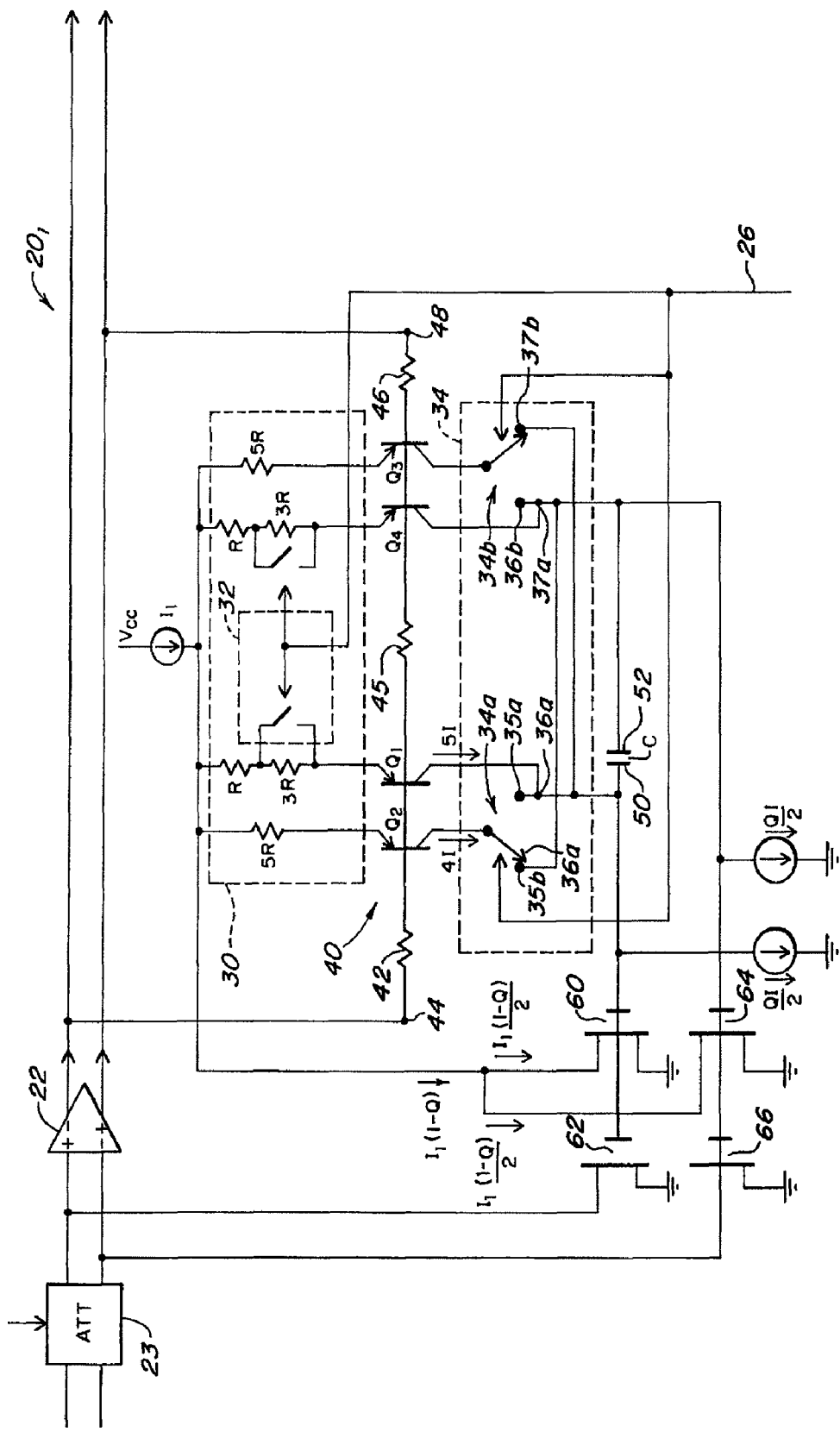
FIG. 3 illustrates a schematic diagram of another conventional radio device.
Figure 4A:
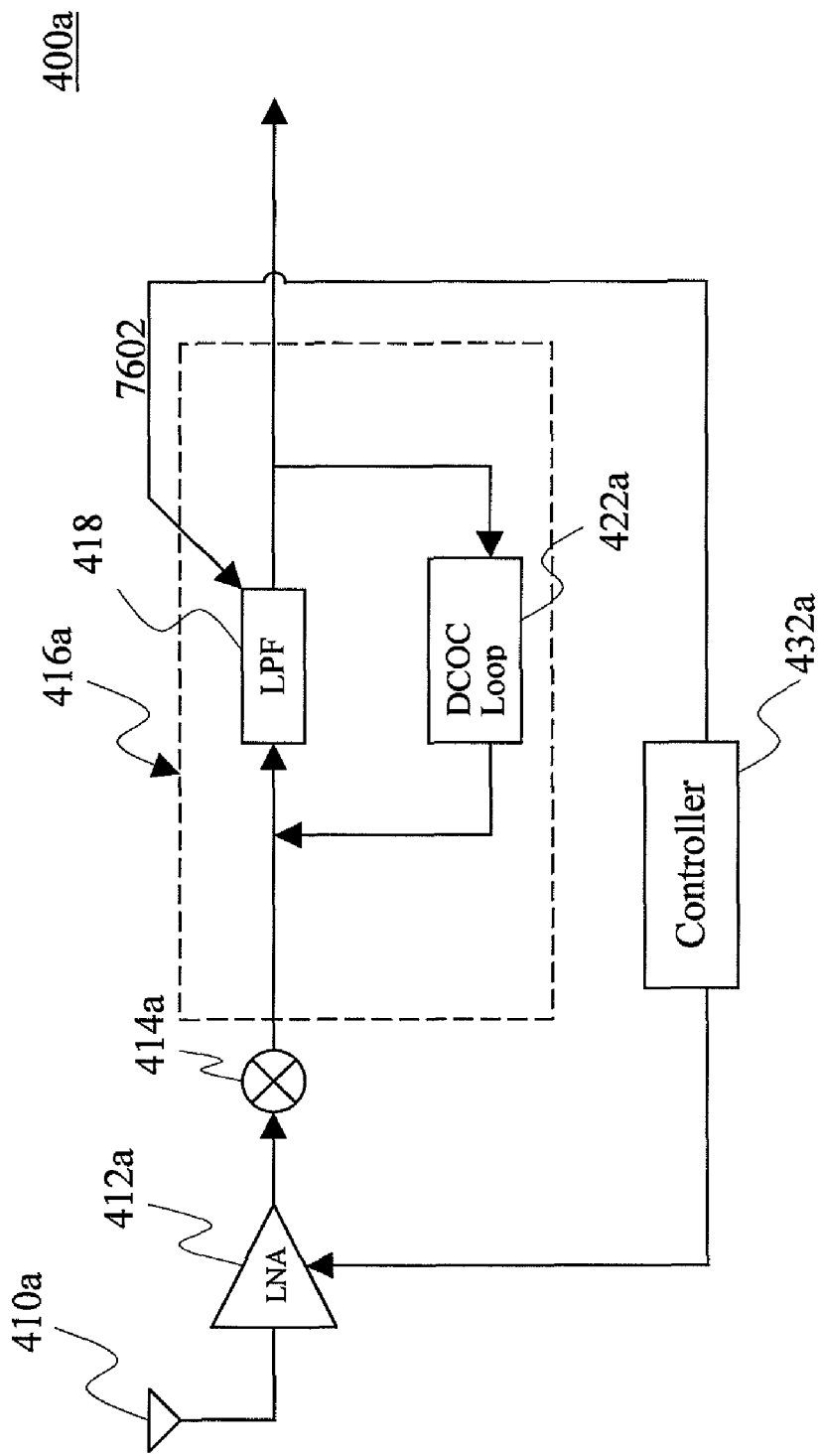
FIGS. 4A-4F illustrate a schematic diagram of a respective radio device with an apparatus for enhancing DC offset correction speed, according to various preferred embodiments of the present invention.

Firstly referring to illustration of FIG. 4A, a radio device 400a as a direct convention receiver (DCR), according to a first preferred embodiment of the present invention, has an antenna 410a, a low noise amplifier (LNA) 412a, a mixer 414a, a controller 432a, and a signal processing unit 416a for enhancing DC offset correction speed of the radio device 400a. The signal processing unit 416 further has a low pass filter (LPF) 418 as a filtering stage, and a DC offset correction (DCOC) loop 422a applied on the low pass filter (LPF) 418.

Initially, the mixer 414a generates a first baseband signal by mixing a RF or IF signal with a local oscillating signal via the antenna 410a and the low noise amplifier 412a. The low pass filter 418 is operative to filter and amplify the first baseband signal from the mixer 414a and output a second baseband signal to serve as an output signal of the signal processing unit 416a. However, the controller 432a, i.e. a processor, MCU or DSP, can generate a control signal 7602 to control bandwidth variance of the low pass filter 418 at 3 dB corner frequency, in response to the first baseband signal. In fact, the low pass filter 418 is disposed with a bandwidth-controlling unit 760a or 760b (shown in FIGS. 7A & 7B and detailed later), which depends upon the control signal 7602 to adjust the bandwidth of the low pass filter 418 to be either a normal operational bandwidth, i.e. 150 K, or wider than the normal operational bandwidth, i.e. 5 MHz, for rapidly outputting the second baseband signal. For performing a corrected DC offset process, the DC offset correction loop 422a defined with at least a Digital-to-Analog converter and a binary search means is applied to compensate for an input of the low pass filter 418 (i.e. the first baseband signal), and thereby mitigating a DC offset of the second baseband signal from the low pass filter 418 as an output signal of the signal processing unit 416a.

Figure 4B:
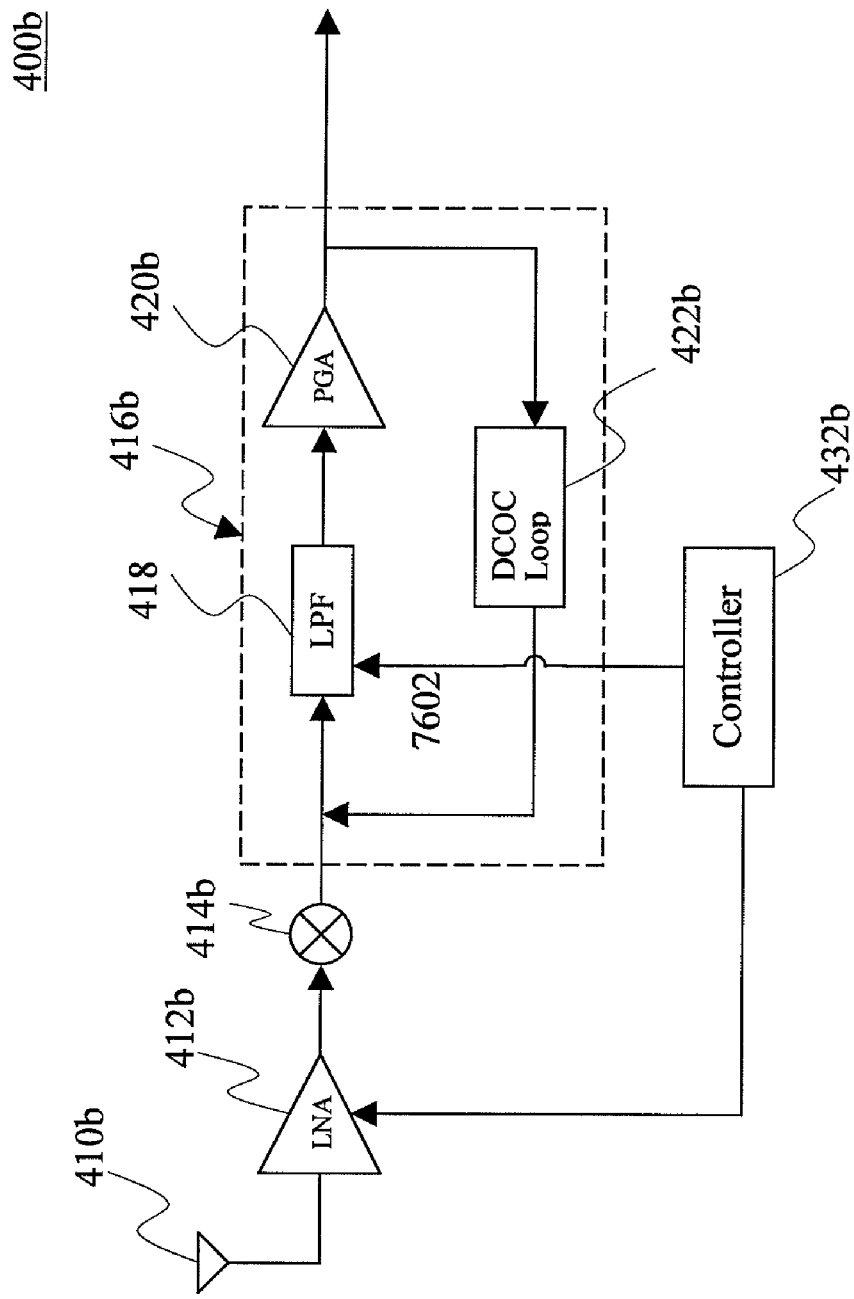

In another case, as shown in FIG. 4B, a radio device 400b like a direct convention receiver (DCR) has an antenna 410b, a low noise amplifier (LNA) 412b, a mixer 414b, a controller 432b, and a signal processing unit 416b. However differently from the signal processing unit 416a of FIG. 4A, the signal processing unit 416b further comprises a programmable gain amplifier (PGA) 420b as a gain stage beside a low pass filter 418 and a DCOC loop 422b. The low pass filter 418 also disposed with a bandwidth-controlling unit 760a or 760b (shown in FIGS. 7A & 7B) based on a variable bandwidth control of the controller 432b at 3 dB corner frequency filters a first baseband signal from the mixer 414b, and therefore generates a second baseband signal.

The programmable gain amplifier 420b is further operative to amplify the second baseband signal from the low pass filter 418 and output a third baseband signal serving as an output signal of the signal processing unit 416b.

The DC offset correction loop 422b differing from said DC offset correction loop 422a on layout, compensates an input of the low pass filter 418 (i.e. the first baseband signal), and thereby mitigating a DC offset of the third baseband signal output from the programmable gain amplifier 420b as an output signal of the signal processing unit 416b.

Figure 4C:
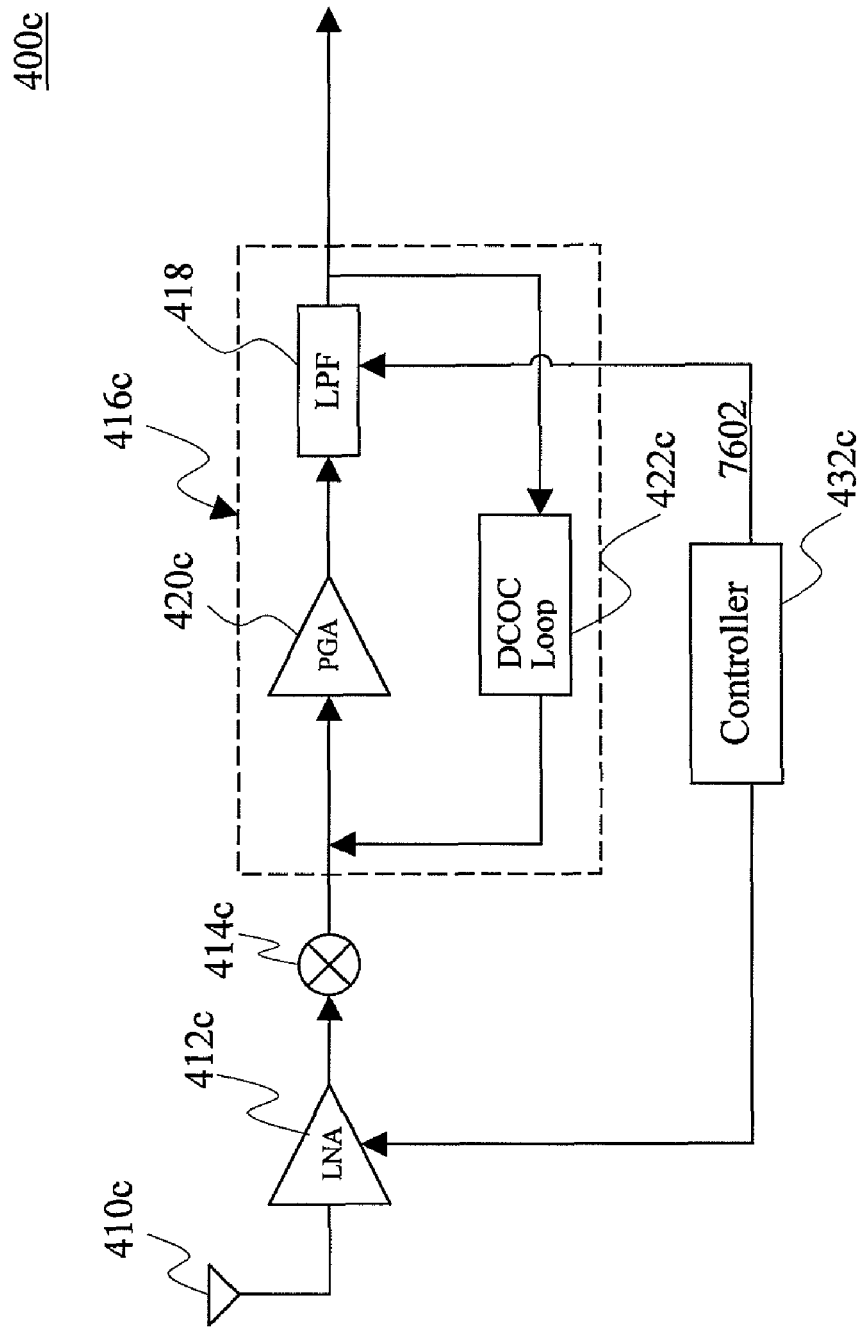

In another case, as shown in FIG. 4C, a radio device 400c like a direct convention receiver (DCR) has an antenna 410c, a low noise amplifier (LNA) 412c, a mixer 414c, a controller 432c, and a signal processing unit 416c. The signal processing unit 416c is constructed similarly to the signal processing unit 416b of FIG. 4B, including a programmable gain amplifier (PGA) 420c (like a gain stage), a low pass filter 418 and a DCOC loop 422c, beside an inverse layout that the programmable gain amplifier 420c is coupled between an input of the signal processing unit 416c and the low pass filter 418. It means that the programmable gain amplifier 420c is operative to amplify a first baseband signal from the mixer 414c to generate a second baseband signal. Then the low pass filter 418 filters the second baseband signal from the programmable gain amplifier 420c so as to output a third baseband signal to serve as an output signal of the signal processing unit 416b. Also, the low pass filter 418 is disposed with a bandwidth-controlling unit 760a or 760b (shown in FIGS. 7A & 7B) based on a variable bandwidth control of the controller 432c at 3dB corner frequency.

Accordingly, the DC offset correction loop 422c differing from said DC offset correction loop 422b of FIG. 4B on layout, compensates an input of the programmable gain amplifier 420c (i.e. the first baseband signal), and thereby mitigating a DC offset of the third baseband signal from the low pass filter 418 to serve as an output signal of the signal processing unit 416c.

Figure 4D:
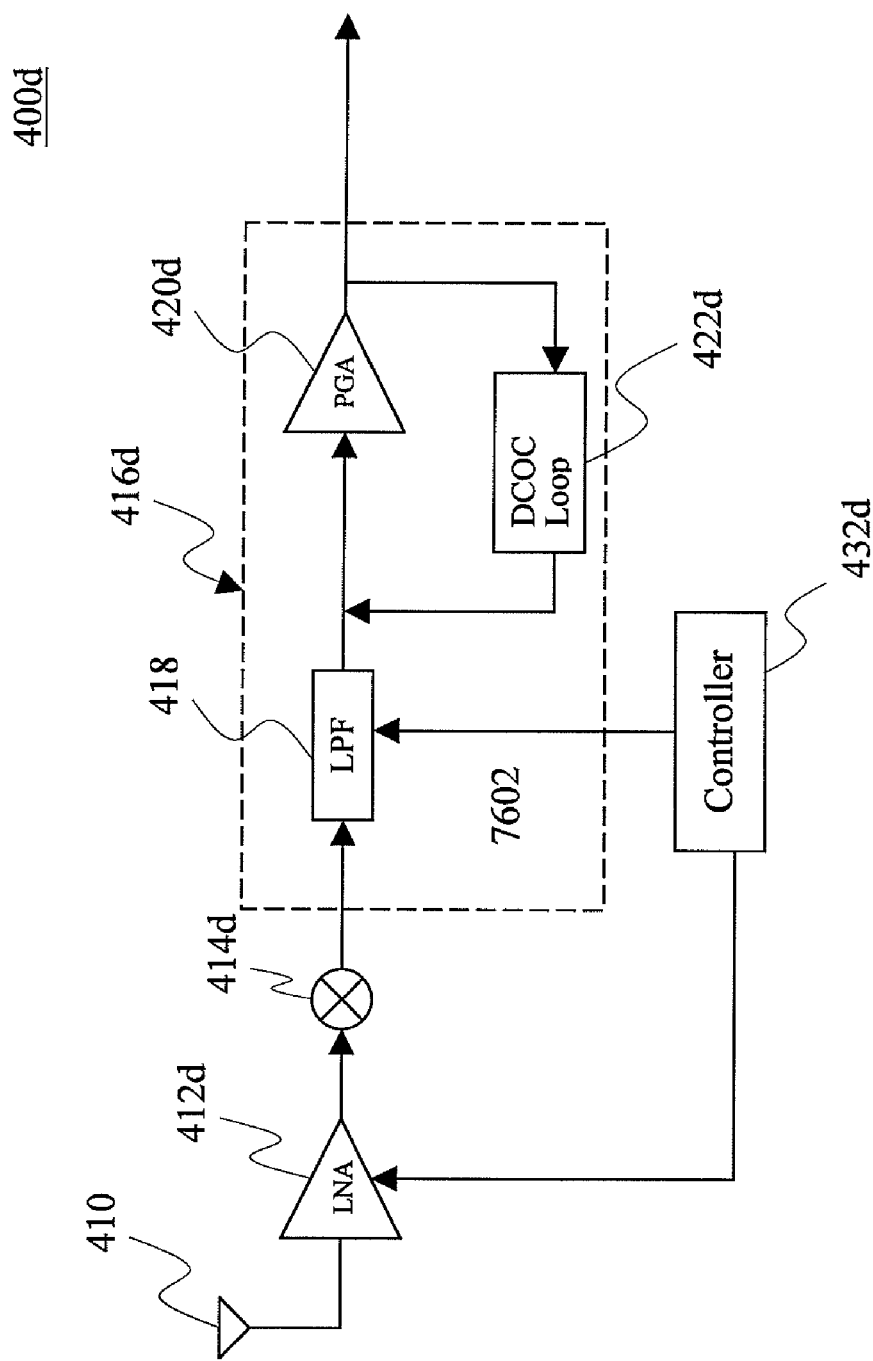

In another case, as shown in FIG. 4d, a radio device 400d like a direct convention receiver (DCR) has an antenna 410d, a low noise amplifier (LNA) 412d, a mixer 414d, a controller 432d, and a signal processing unit 416d. The signal processing unit 416d is constructed similarly to the signal processing unit 416b of FIG. 4B, including a programmable gain amplifier (PGA) 420d (like a gain stage), a low pass filter 418 and a DCOC loop 422d, beside a different layout that the DCOC loop 422d is applied on only the programmable gain amplifier (PGA) 420d. It means that the low pass filter 418 is operative to filter a first baseband signal from the mixer 414d to generate a second baseband signal. Then the programmable gain amplifier (PGA) 420d filters the second baseband signal from the low pass filter 418 so as to output a third baseband signal to serve as an output signal of the signal processing unit 416d. The low pass filter 418 is disposed with the same as the other cases as aforementioned.

More differently from said DCOC loop 422b of FIG. 4B on layout, the DC offset correction loop 422d, compensates an input of the programmable gain amplifier 420d (i.e. the second baseband signal), and thereby mitigating a DC offset of the third baseband signal from the programmable gain amplifier 420d as an output signal of the signal processing unit 416d.

Figure 4E:
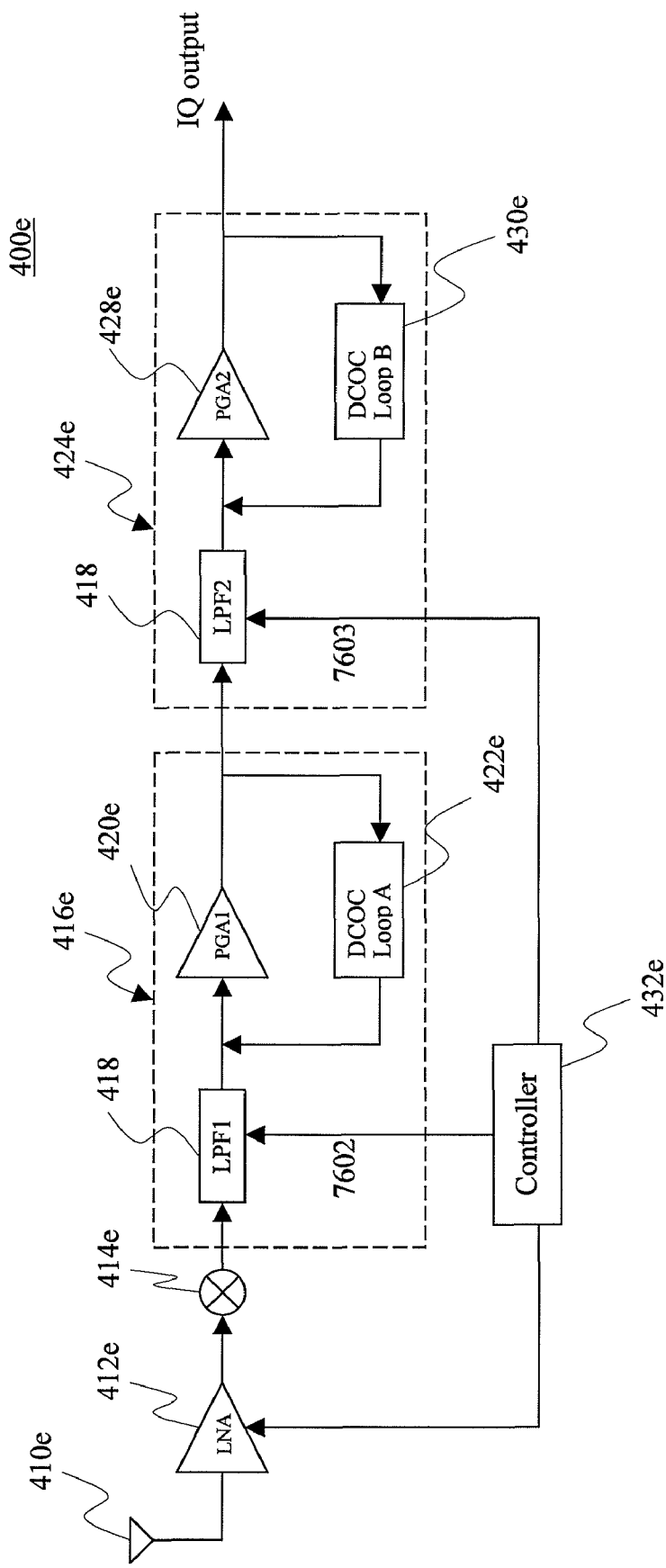

In another case, as shown in FIG. 4E, a radio device 400e like a direct convention receiver (DCR) has an antenna 410e, a low noise amplifier (LNA) 412e, a mixer 414e, a controller 432e, and two-stage first and second signal processing units 416e, 424e coupled with each other.

The first signal processing unit 416e has a first baseband filter 418 as a low pass filter (LPF), a first gain stage 420e as a programmable gain amplifier (PGA) coupled to the first baseband filter 418, and a first DC offset correction (DCOC) loop 422e applied on the first gain stage 420e. The first baseband filter 418 is operative to filter a first baseband signal through the mixer 414e from the antenna 410e and the low noise amplifier (LNA) 412e, and therefore output a second baseband signal. Accurately, the first baseband filter 418 is also disposed with a first bandwidth-controlling unit 760a or 760b (shown in FIGS. 7A & 7B), which depends upon a control signal 7602 generated from the controller 432e to adjust a bandwidth variance of the low pass filter 418 to be either a normal operational bandwidth, i.e. 150 K, or wider than the normal operational bandwidth, i.e. 5 MHz, for rapidly outputting the second baseband signal. Then the first gain stage 420e amplifies the second baseband signal from the first baseband filter 418 to output a third baseband signal serving as an output signal of the first signal processing unit 416e. For a corrected DC offset process, the first DC offset correction loop 422e also defined with at least a Digital-to-Analog converter and a binary search means, compensates the second baseband signal at an input of the first gain stage 420e and mitigate a DC offset of the third baseband signal from the first gain stage 420e as the output signal of the first signal processing unit 416e.

Actually, the second signal-processing unit 424e is identical with said first signal-processing unit 418e in both structure and function, including a second baseband filter 426e as a low pass filter (LPF), a second gain stage 428e as a programmable gain amplifier (PGA), and a second DC offset correction (DCOC) loop 430e.

Figure 7A:
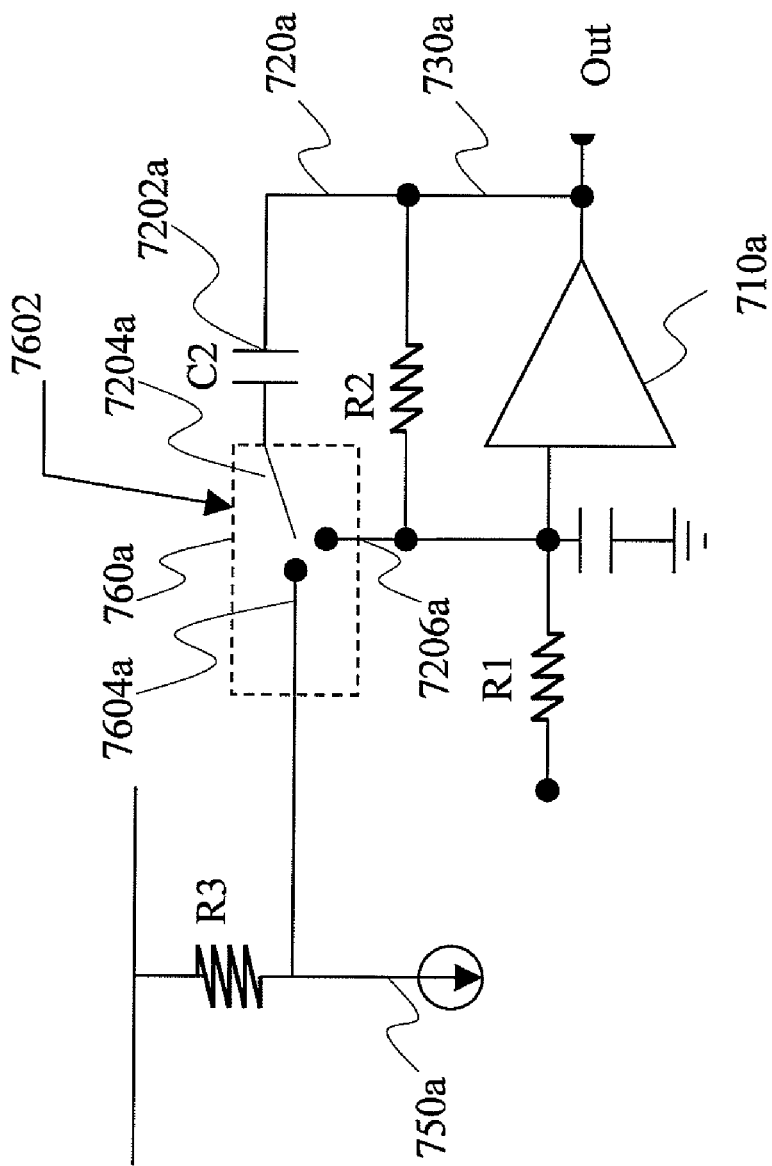
FIGS. 7A & 7B illustrate a schematic diagram of a respective low pass filter selectively applied within the radio devices shown in FIGS. 4A-4F.

The second baseband filter 426e for receiving the third baseband signal from the first signal processing unit 416e and outputting a fourth baseband signal also has a second bandwidth-controlling unit 760a, 760b (as shown in FIGS. 7A & 8B), which depends upon a control signal 7603 from the controller 432e to adjust a bandwidth variance of the second baseband filter 426e to be either a normal operational bandwidth or wider than the normal operational bandwidth.

The second gain stage 428e is operative to amplify the fourth baseband signal from the second baseband filter 426e and output a fifth baseband signal to serve as an output signal of the second signal processing unit 424e. The second DC offset correction (DCOC) loop 430e compensates an input of the second gain stage 428e (as the fourth baseband signal), and thereby mitigating a DC offset of the fifth baseband signal from the second gain stage 428e to serve as the output signal of the second signal processing unit 424e.

Figure 4F:
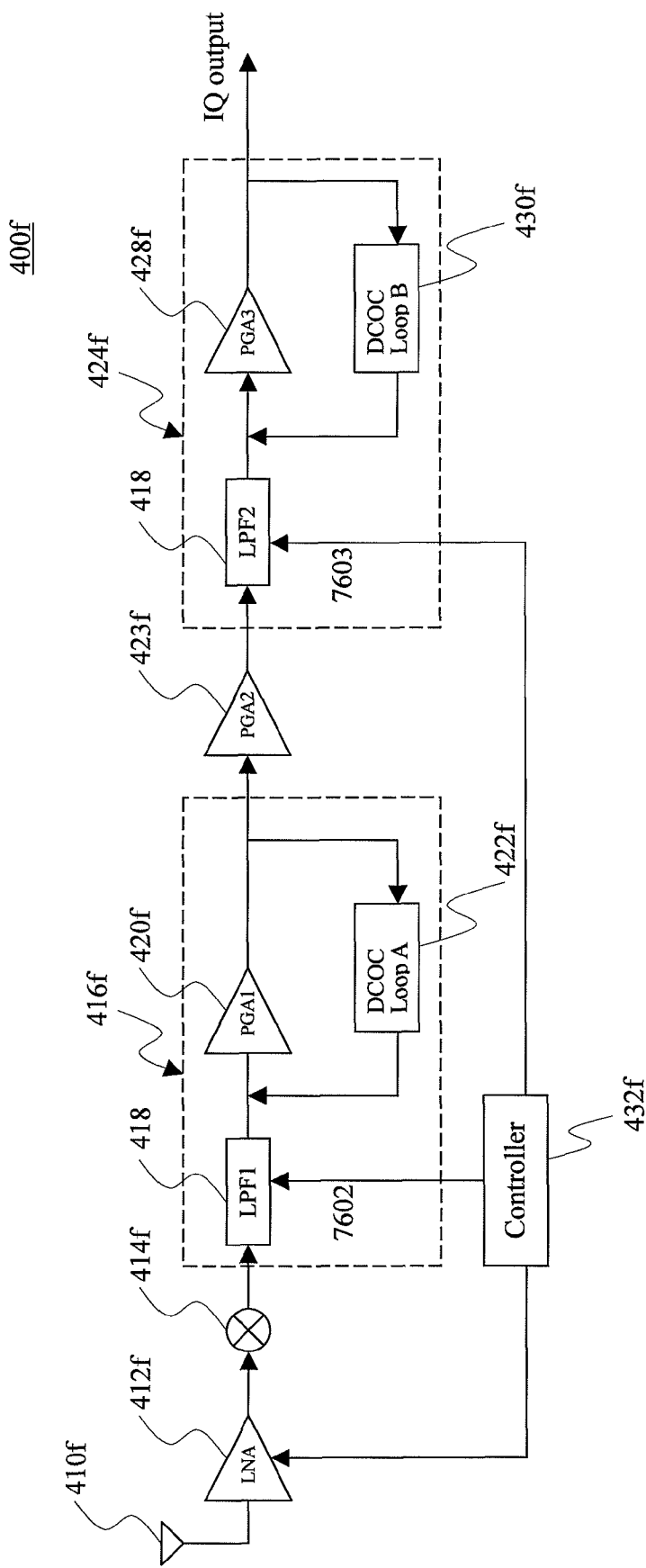

Please be noted that the second DC offset correction loop 430e is applied to efficiently correct a self-mixing DC offset from the low noise amplifier (LNA) 412e and a DC offset generated from the first baseband filter 418 and first gain stage 420e, differently from the first DC offset correction loop 422e. In another case, as shown in FIG. 4F, a radio device 400f similar to said radio device 400e of FIG. 4E, includes an antenna 410f, a low noise amplifier (LNA) 412f, a mixer 414f, a controller 432f, a first and second signal processing units 416f, 424f, except that a programmable gain amplifier (PGA) 423f is interconnected between the first and second signal processing units 416f, 424f and operative to amplify a third baseband signal via a DCOC process from the first signal processing unit 416f and then output a corresponding signal to the second signal processing unit 424f for next DC offset process.

In an exemplary shown in FIGS. 7A, the low pass filter 418 applied in FIGS. 4A-4F is realized as a single-ended low pass filter, which includes a capacitor section 720a, a resistor section 730a, a bandwidth-controlling unit 760a, and an operational amplifier 710a connected parallel with the capacitor section 720a and a resistor section 730a, wherein a capacitor (C2) 7202a is disposed in the capacitor section 720a and has an electrode terminal 7204a thereon, which is extended to the bandwidth-controlling unit 760a. A first node 7206a is extended from an input of the operational amplifier 710a, and a second node 7604a is extended from a reference DC voltage source 750a.

The bandwidth-controlling unit 760a serves as a switch, according to a control signal 7602 instructed from the controller 432a-432f (see FIGS. 4A-4F ), to selectively connect the electrode terminal 7204a of the capacitor 7202a in the low pass filter 418 with either the first node 7206a as a normal-operating point in the filter 418 or the second node 7604a having a first preset voltage level provided from the reference DC voltage source 750a, whereby the bandwidth-controlling unit 760a is capable of adjusting a bandwidth of the low pass filter 418 to be either a normal operational bandwidth or wider than the normal operational bandwidth, for rapidly responding to entry of the first baseband signal (see FIGS. 4A-4F ). Actually, the controller 432a-432f (i.e. a processor, MCU or DSP) is adapted to determine a pre-charge or discharge phase of the capacitor 7202a by switching connection direction of the electrode terminal 7204a of the capacitor 7202a to different nodes (i.e. the first and second nodes) with different DC voltage levels.

While the electrode terminal 7204a of the capacitor (C2) 7202a is selectively switched by the bandwidth-controlling unit 760a to be electrically connected with the second node 7604a of the reference DC voltage source 750a, the reference DC voltage source 750a provides the operational amplifier 710a with a DC voltage input to perform a pre-charge phase that pre-charges the capacitor 7202a to reach a preset voltage level. It means that the preset voltage level will be substantially equal to an input DC level of the operational amplifier 710a and the reference DC voltage source 750a pre-charges the capacitor 7202a. Thus, the bandwidth of the low pass filter 418 upon entry of the first baseband signal is adjusted to be wider than a normal operational bandwidth for speeding up signal pass.

As soon as the electrode terminal 7204a of the capacitor (C2) 7202a is switched to a first node 7206a (as the normal-operating point) by the bandwidth-controlling unit 760a, a discharging phase that the capacitor (C2) 7202a discharges the input of the operational amplifier 710a is performed. The low pass filter 418 can be adjusted back to the normal operational bandwidth.

Therefore, it is understandable that an application of pre-charging the capacitor 7202a to preset voltage level is able to rapid adjust the bandwidth variance of 3 Bd corner frequency of the low pass filter 418, and therefore speed up a setting time of the low pass filter 418 (detailed later).

Figure 7B:
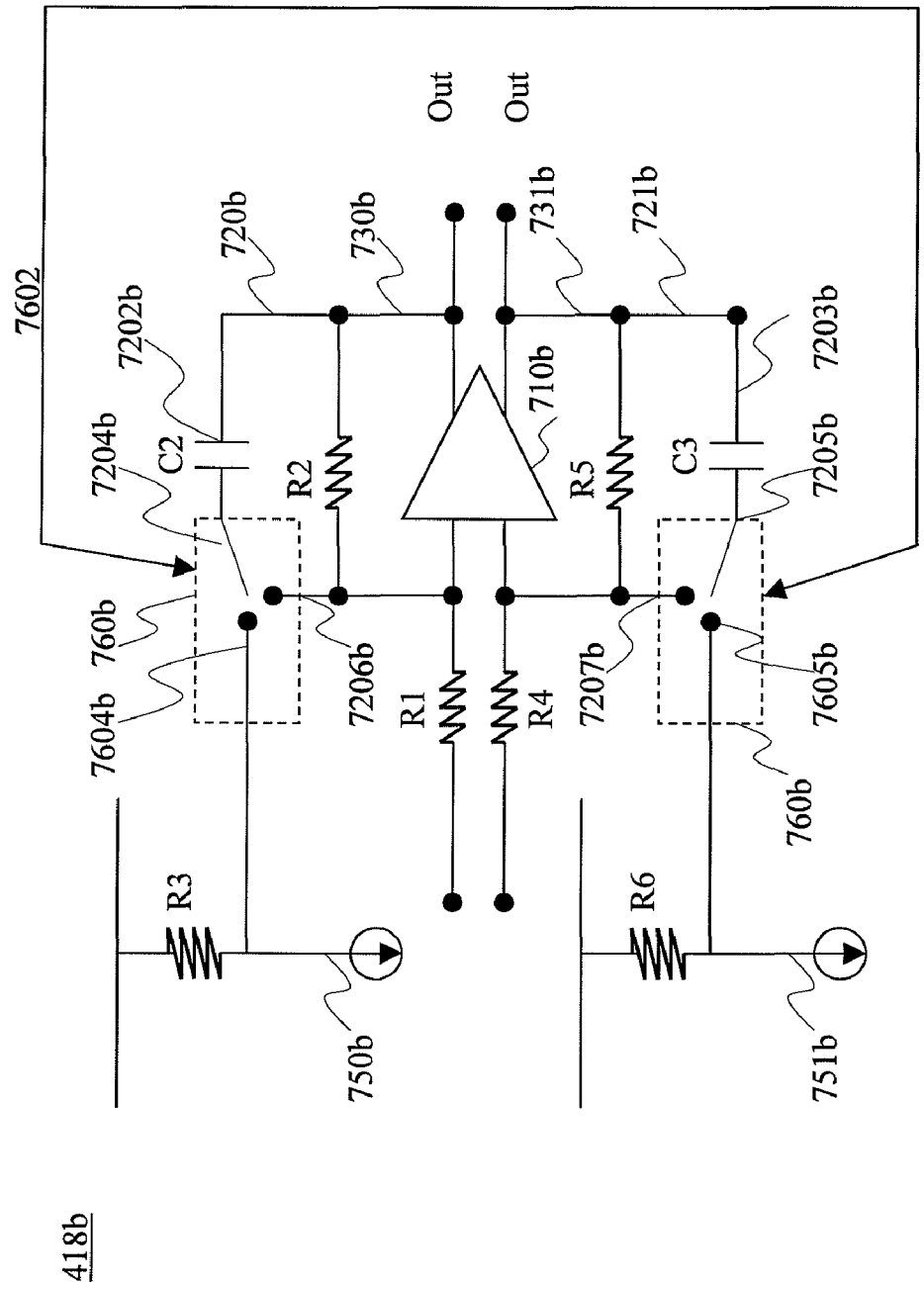

In another exemplary shown in FIG. 7B, the low pass filter 418 applied in FIGS. 4A-4F is realized as a differential low pass filter, which includes a bandwidth-controlling unit 760b, an operational amplifier 710b, and an up-half part and a down-half part.

The up-half part of the low pass filter 418 has a first capacitor section 720b and a first resistor section 730b wherein a first capacitor (C2) 7202b is disposed in the first capacitor section 720b and has an first electrode terminal 7204b thereon, which is extended to the bandwidth-controlling unit 760b. A first node 7206b is located from a first input of the operational amplifier 710b, and a second node 7604b is extended from a first reference DC voltage source 750b. The down-half part of the low pass filter 418 has a second capacitor section 721b, a second resistor section 731b wherein a second capacitor (C3) 7203b is disposed in the second capacitor section 721b and has a second electrode terminal 7205b thereon, which is extended to the bandwidth-controlling unit 760b. A third node 7207b is located from a second input of the operational amplifier 710b, and a fourth node 7605b is extended from a second reference DC voltage source 751b. It is noted that the operational amplifier 710b is regarded as a differential amplifier parallel with the first and second capacitors 7202b, 7203b. The bandwidth-controlling unit 760b further has a first switch located on the up-half part of the filter 418, and a second switch located on the down-half part of the filter 418. The bandwidth-controlling unit 760b depends upon a control signal 7602 instructed from the controller 432a-432f (see FIGS. 4A-4F), respectively, to control the first switch to selectively connect the first electrode terminal 7204b of the capacitor 7202b in the low pass filter 418 to either the first node 7206b (as a first normal-operating point) or the second node 7604a having a first preset voltage level provided from the reference DC voltage source 750b, and to control the second switch to selectively connect the second electrode terminal 7205b of the second capacitor 7203b to either the third node 7207b (as a second normal-operating point) or the fourth node 7605b of the second reference DC voltage source 751b having a second preset voltage level.

While the electrode terminal 7204b, 7205b of the first and second capacitors 7202b, 7203b are selectively switched by the first and the second switches, respectively, to the second node 7604b having the first preset voltage level and the fourth node 7605b having the second preset voltage level, the first and second preset voltage levels are substantially equal to respective first and second DC levels at the first and second inputs of the differential amplifier. The first and second reference DC voltage sources 750b, 751b respectively pre-charges the first and second capacitors 7202b, 7203b thereby adjusting the bandwidth of the low pass filter 418 to be wider than the normal operational bandwidth.

Oppositely, as soon as the first terminals 7204b, 7205b of the first and second capacitors 7202b, 7203b are selectively switched by the first and second switches to the first and third nodes 7206b, 7207b respectively, the first and second capacitors 7202b, 7203b respectively discharge to the first and second inputs of the differential amplifier 710b thereby adjusting the bandwidth of the low pass filter 418 back to the normal operational bandwidth and speeding up a settling time of the low pass filter 418.

Figure 5:
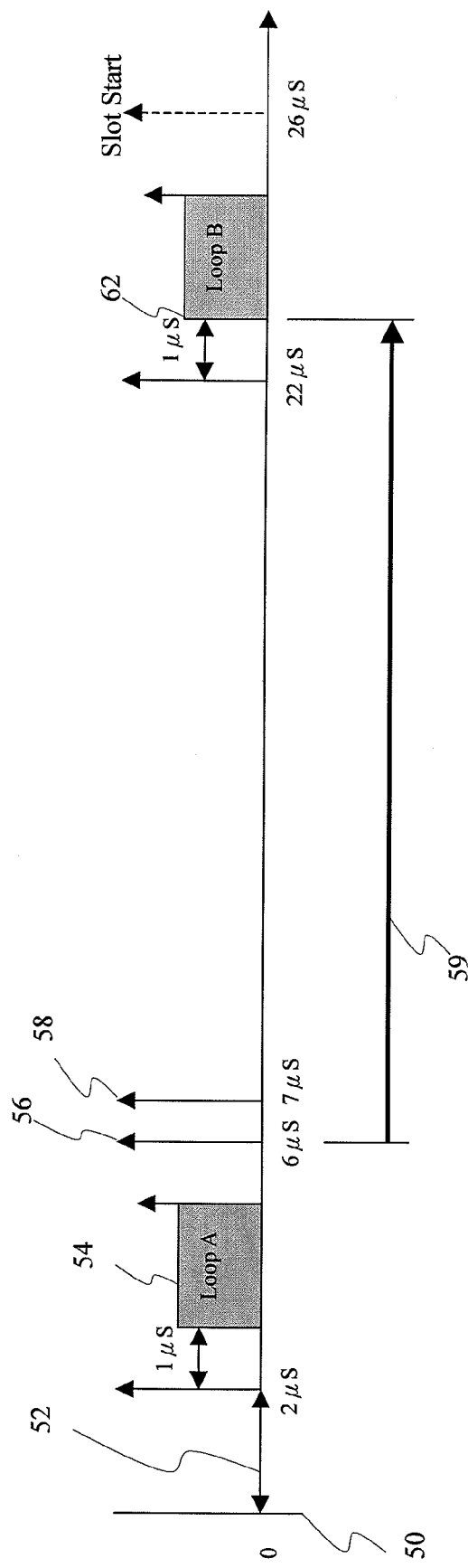
FIG. 5 illustrates a schematic time slot for the radio device shown in FIG. 4E.
Figure 6:
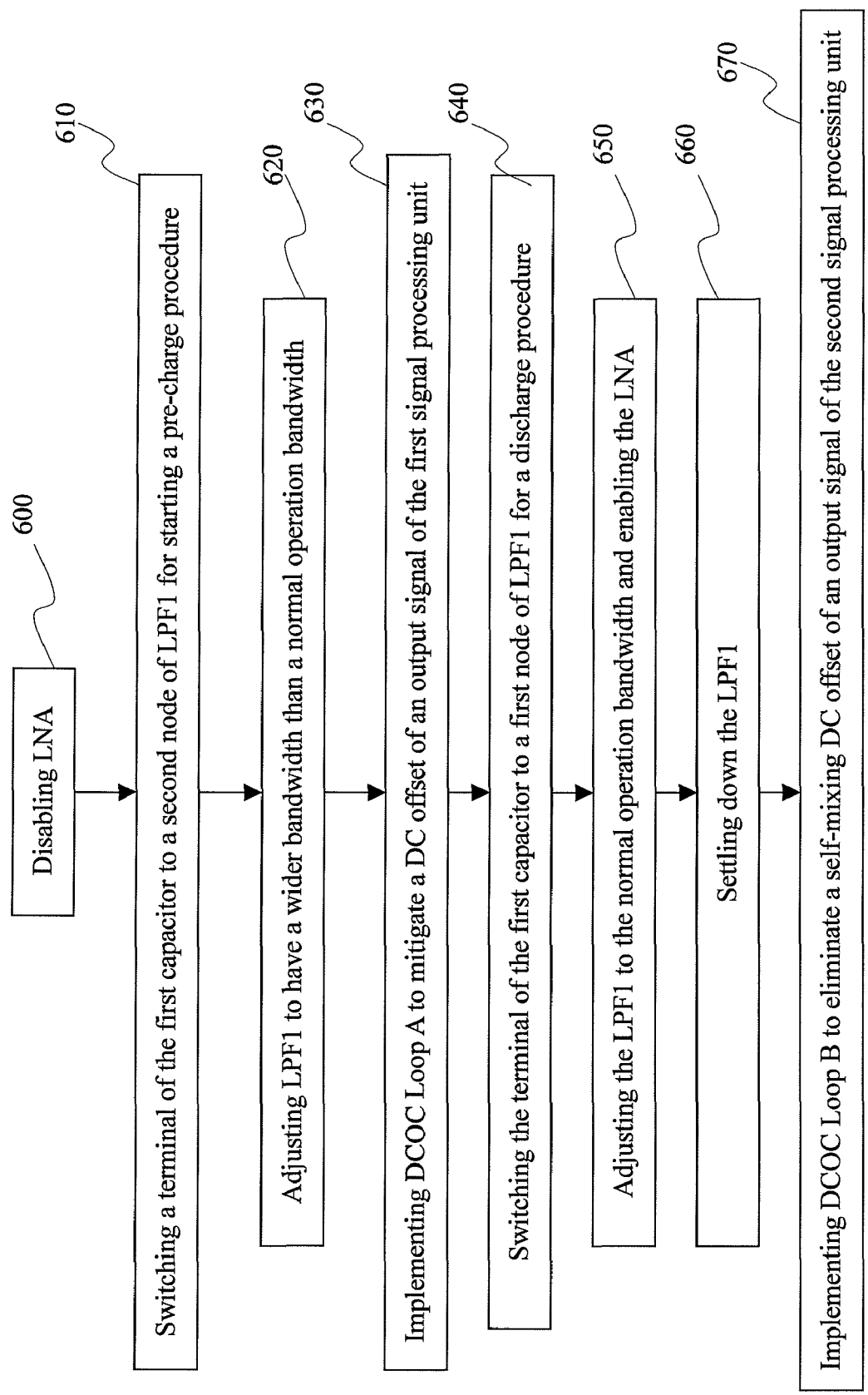
FIG. 6 illustrates a flow chart of a method for enhancing DC offset correction of the radio device shown in FIG. 4E.

Further referring to FIG. 5, an allotted time slot of approximate 26 μs for the radio devices 400e of FIG. 4E is presented. Through the time points 50~52, the controller 432e turns off the LNA 412e, and starts the pre-charge phase for the capacitor 7202a (see FIG. 7A) thereby raising the bandwidth of the first baseband filter 418, i.e. 5 MHz for rapidly receiving the first baseband signal. In a period 54, the first DCOC loop 422e performs DC offset correction on the first gain stage 420e. From the time points 56 to 62, the LNA 410e is being turned on for receiving the next signal, and the first baseband filter 418 starts to be settled after its frequency bandwidth is adjusted back to the normal operating bandwidth like 150K, as a point 58 and there is a self-mixing DC offset stable time of approximate 17 μs. Therefore, the DCOC process can also cancel out the self-mixing DC offset if the LNA 410e is set to turn-on in time. At the time point 62, the second DCOC loop 430e performs DC offset correction on the second gain stage 426e. On the demand, the time point for adjusting the bandwidth of the first baseband filter 418 to the normal operational bandwidth can be substantially the same as or earlier than an actual time point of adjusting the bandwidth of the second baseband filter 426e to the normal operational bandwidth of the second baseband filter 426e.

Additionally, a method for enhancing DC offset correction speed in a radio device as shown in FIG. 4e, according to a preferred embodiment of the present invention, comprises the following steps of:

In step 600, disabling a LNA of the radio device;

In step 610, switching an electrode terminal of a first capacitor of a first baseband filter (LPF1) by a controller via a first bandwidth-controlling unit to connect with a reference DC voltage source thereby starting a pre-charge procedure of the first capacitor;

In step 620, adjusting the bandwidth of the LPF1 to be wider than a normal operational bandwidth;

In step 630, implementing a first DC offset correction loop (A) on a first gain stage to eliminate a DC offset of an output signal of a first signal processing unit;

In step 640, after the first capacitor is pre-charged to reach a preset voltage level, switching the electrode terminal of the first capacitor of the LPF1 by the controller via a first bandwidth-controlling unit to connect with a first node as a normal-operating point allocated at an input of a first operational amplifier of the LPF1 for a discharge procedure;

In step 650, adjusting the bandwidth of the LPF1 to be a normal operational bandwidth and enabling the LNA;

In step 660, speeding up a settle time of the LPF1, accordingly; and

In step 670, implementing a second DC offset correction loop (B) on a second gain stage to eliminate a DC offset including a self-mixing DC offset of an output signal of a second signal processing unit.

In conclusion, the apparatus and method for enhancing DC offset correction speed of a radio device according to the present invention control connection direction of a capacitor to adjustably vary 3 dB corner frequency of the baseband filter and pre-charge the capacitor to set a preset voltage level thereby reducing a settle time of the baseband filter. Beside, the apparatus is realized with a simplified configuration so as to reduce both an occupied area and component cost.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for enhancing DC offset correction speed of a receiver having a signal processing unit comprising a filtering stage receiving a baseband signal with a feedforward configuration and a DC offset correction unit, comprising the steps of:

disabling, by a controller, a low noise amplifier (LNA);

adjusting, by the controller, a bandwidth of the filtering stage to be wider than a normal operational bandwidth of the filtering stage, in response to the baseband signal, by disconnecting a terminal of a first capacitor in the filtering stage from a first node that is in the filtering stage, and connecting the terminal of the first capacitor to a second node having a first preset voltage level while the LNA is disabled;

applying a DC offset correction process for mitigating a DC offset of an output signal of the signal processing unit; and adjusting the bandwidth of the filtering stage back to the normal operational bandwidth by connecting the terminal of the first capacitor back to the first node, wherein as soon as the filtering stage is a differential low pass filter, the step of adjusting a bandwidth of the filter to be wider than a normal operational bandwidth of the filtering stage further comprises a step of: disconnecting a terminal of a second capacitor in the filtering stage from a third node that is in the filtering stage, and connecting the terminal of the second capacitor to a fourth node having a second preset voltage level.

2. The method as described in claim 1 wherein the step of adjusting the bandwidth of the filtering stage back to the normal operational bandwidth further comprises a step of: connecting the terminal of the second capacitor back to the third node.

3. The method as described in claim 1 wherein the filtering stage further comprises an operational amplifier, and the first and second preset voltage levels are substantially equal to respective input DC level of the operational amplifier.

4. The method as described in claim 1 wherein the filtering stage is capable of filtering and amplifying the baseband signal, and generating an output signal to serve as the output signal of the signal processing unit, and the DC offset correction process is applied to compensate for an input of the filtering stage so as to mitigate the DC offset of the output signal of the signal processing unit.

5. The method as described in claim 1 wherein the signal processing unit further comprises a gain stage coupled to the filtering stage, and an output signal of the gain stage serves as the output signal of the signal processing unit.

6. The method as described in claim 5 wherein the signal processing unit further comprises a DC offset correction unit independently of the filtering stage, and the DC offset correction process is applied on the DC offset correction unit to compensate for an input of the filtering stage so as to mitigate the DC offset of the output signal of the signal processing unit.

7. The method as described in claim 5 wherein the DC offset correction process is applied to compensate for an input of the gain stage so as to mitigate the DC offset of the output signal of the signal processing unit.

8. The method as described in claim 1 wherein the signal processing unit further comprises a gain stage coupled between an input of the signal processing unit and the filtering stage, and the DC offset correction process is applied to compensate for an input of the gain stage so as to mitigate the DC offset of the output signal of the signal processing unit.

9. The method as described in claim 1 wherein the receiver is a direct convention receiver.

10. The method as described in claim 1, wherein the terminal is switched for the first node and the second node, and the first preset voltage level is a fixed voltage level.

11. The method as described in claim 1, wherein the step of adjusting the bandwidth of the filtering stage to be wider than the normal operational bandwidth of the filtering stage in response to the baseband signal, comprises a step of switching a single switch dedicated on disconnecting the terminal of the first capacitor in the filtering stage from the first node that is in the filtering stage, and connecting the terminal of the first capacitor to the second node having the first preset voltage level.

12. The method as described in claim 1, wherein the single switch is a switch having three terminals respectively coupled to the first terminal, the first node and the second node.

13. A receiver for receiving a first baseband signal with enhanced DC offset correction speed, comprising:
 a low noise amplifier (LNA) coupled to a controller;
 a signal processing unit comprising:
  a filtering stage having a feedforward configuration for filtering the first baseband signal and outputting a second baseband signal, having a bandwidth-controlling unit capable of adjusting a bandwidth of the filtering stage to be either a normal operational bandwidth or wider than the normal operational bandwidth for rapidly response to the first baseband signal, wherein the bandwidth-controlling unit comprises a first switch, according to a control signal generated by the controller, for selectively connecting a first terminal of a first capacitor in the filtering stage to either a first node in the filtering stage or a second node having a first preset voltage level for said bandwidth adjustment; and
 a DC offset correction unit for mitigating an DC offset of an output signal of the signal processing unit,
 wherein the filtering stage is a differential low pass filter, and the bandwidth-controlling unit further comprises a second switch, according to the control signal, for selectively connecting a first terminal of a second capacitor in the filtering stage to a third node in the filtering stage or to a fourth node having a second preset voltage level,
 wherein the differential low pass filter comprises: the first node connected to a first input of a differential amplifier, a second terminal of the first capacitor connected to a first output of the differential amplifier, the second node having the first preset voltage level which is connected to a first reference DC voltage source, the third node connected to a second input of the differential amplifier, and a second terminal of the second capacitor connected to a second output of the differential amplifier, and the fourth node having the second preset voltage level, which is connected to a second reference DC voltage source.

14. The receiver as described in claim 13 wherein the filtering stage further comprises the differential amplifier parallel with the first and second capacitors.

15. The receiver as described in claim 13 wherein as soon as the first terminals of the first and second capacitors are selectively switched by the first and the second switches to the second node having the first preset voltage level and the fourth node having the second preset voltage level respectively, the first and second preset voltage levels are substantially equal to respective first and second input DC levels of the differential amplifier, and the first and second reference DC voltage sources respectively pre-charges the first and second capacitors thereby adjusting the bandwidth of the low pass filter to be wider than the normal operational bandwidth.

16. The receiver as described in claim 15 wherein as soon as the first terminals of the first and second capacitors are selectively switched by the first and second switches to the first and third nodes respectively, the first and second capacitors discharge to the first and second inputs of the differential amplifier thereby adjusting the low pass filter back to the normal operational bandwidth and speeding up a settling time of the low pass filter.

17. The receiver as described in claim 13 wherein the filtering stage is capable of filtering and amplifying the first baseband signal and outputting the second baseband signal to serve as the output signal of the signal processing unit so that the DC offset correction unit is applied to compensate for the first baseband signal so as to mitigate the DC offset at the output of the signal processing unit.

18. The receiver as described in claim 13 wherein the signal processing unit further comprises a gain stage coupled to the filtering stage and an output signal of the gain stage serves as the output signal of the signal processing unit.

19. The receiver as described in claim 18 wherein the DC offset correction unit having a feedforward configuration is applied to compensate for an input of the filtering stage so as to mitigate the DC offset of the output signal of the signal processing unit.

20. The receiver as described in claim 18 wherein the DC offset correction unit is applied to compensate for an input of the gain stage so as to mitigate the DC offset of the output signal of the signal processing unit.

21. The receiver as described in claim 13 wherein the signal processing unit further comprises a gain stage coupled between an input of the signal processing unit and the filtering stage, and the DC offset correction unit is applied to compensate for an input of the gain stage so as to mitigate the DC offset of the output signal of the signal processing unit.

22. The receiver as described in claim 13, wherein the first terminal is switched for the first node and the second node, and the first preset voltage level is a fixed voltage level.

23. The method as described in claim 13, wherein the first switch is a first single switch, according to the control signal, dedicated for selectively connecting the first terminal of the first capacitor in the filtering stage to either the first node in the filtering stage or the second node having the first preset voltage level for said bandwidth adjustment.

24. A filtering device having a feedforward configuration capable of reducing a settling time upon switching bandwidth, comprising:
a bandwidth-controlling unit capable of adjusting a bandwidth of the filtering device to be either a normal operational bandwidth or wider than the normal operational bandwidth for rapidly response to an input signal, wherein the bandwidth-controlling unit comprises a first switch for selectively connecting a first terminal of a first capacitor in the filtering device to a first node in the filtering device or to a second node having a first preset voltage level according to a control signal generated by a controller configured to control operation of a low noise amplifier (LNA) coupled to the filtering device;
wherein the filtering device is a differential low pass filter, and the bandwidth-controlling unit further comprises a second switch for selectively connecting a first terminal of a second capacitor in the filtering device to a third node in the filtering device or to a fourth node having a second preset voltage level according to the control signal,
wherein the differential low pass filter comprises: the first node connected to a first input of a differential amplifier, a second terminal of the first capacitor connected to a first output of the differential amplifier, the second node having the first preset voltage level which is connected to a first reference DC voltage source, the third node connected to a second input of the differential amplifier, and a second terminal of the second capacitor connected to a second output of the differential amplifier, and the fourth node having the second preset voltage level, which is connected to a second reference DC voltage source.

25. The filtering device as described in claim 24 wherein the filtering device further comprises the differential amplifier parallel with the first and second capacitors.

26. The filtering device as described in claim 24 wherein as soon as the first terminals of the first and second capacitors are selectively switched by the first and the second switches to the second node having the first preset voltage level and the fourth node having the second preset voltage level respectively, the first and second preset voltage levels are substantially equal to respective first and second input DC levels of the differential amplifier, and the first and second reference DC voltage sources respectively pre-charges the first and second capacitors thereby adjusting the bandwidth of the low pass filter to be wider than the normal operational bandwidth.

27. The filtering device as described in claim 26 wherein as soon as the first terminals of the first and second capacitors are selectively switched by the first and second switches to the first and third nodes respectively, the first and second capacitors discharge to the first and second inputs of the differential amplifier thereby adjusting the low pass filter back to the normal operational bandwidth and speeding up a settling time of the low pass filter.

28. The filtering device as described in claim 24 wherein the bandwidth-controlling unit is capable of adjusting the bandwidth of the filtering device without a capacitance change of the first capacitor.

29. The filtering device as described in claim 24, wherein the first terminal is switched for the first node and the second node, and the first preset voltage level is a fixed voltage level.

30. The method as described in claim 24, wherein the first switch is a first single switch dedicated for selectively connecting the first terminal of the first capacitor in the filtering device to the first node in the filtering device or to the second node having the first preset voltage level according to the control signal.

31. A method for reducing a settling time of a filtering device having a feedforward configuration and a first capacitor, comprising the steps of:
controlling, by a controller, operation of a low noise amplifier (LNA) coupled to the filtering device;
selectively switching a first terminal of a first capacitor by a first switch to a first node in the filtering device or to a second node having a first preset voltage level, according to a control signal generated by the controller, and adjusting a bandwidth of the filtering device to be either a normal operational bandwidth as soon as the first terminal of the first capacitor is connected to the first node, or wider than the normal operational bandwidth as soon as the first terminal of the first capacitor is connected to the second node having the first preset voltage level for rapidly response to an input signal to the filtering device;
wherein the filtering device is a differential low pass filter, and further comprises a second switch for selectively switching a first terminal of a second capacitor in the filtering device to a third node in the filtering device or to a fourth node having a second preset voltage level according to the control signal,
wherein the differential low pass filter comprises: the first node connected to a first input of a differential amplifier, a second terminal of the first capacitor connected to a first output of the differential amplifier, the second node having the first preset voltage level which is connected to a first reference DC voltage source, the third node connected to a second input of the differential amplifier, and a second terminal of the second capacitor connected to a second output of the differential amplifier, and the fourth node having the second preset voltage level, which is connected to a second reference DC voltage source.

32. The method as described in claim 31 wherein the filtering device further comprises the differential amplifier parallel with the first and second capacitors.

33. The method as described in claim 31 further comprising: as soon as the first terminals of the first and second capacitors are selectively switched by the first and the second switches to the second node having the first preset voltage level and the fourth node having the second preset voltage level respectively, setting the first and second preset voltage levels to be substantially equal to respective first and second input DC levels of the differential amplifier, and using the first and second reference DC voltage sources to respectively precharge the first and second capacitors thereby adjusting the bandwidth of the low pass filter to be wider than the normal operational bandwidth.

34. The method as described in claim 33 wherein as soon as the first terminals of the first and second capacitors are selectively switched by the first and second switches to the first and third nodes respectively, the first and second capacitors being discharging to the first and second inputs of the differential amplifier thereby adjusting the low pass filter back to the normal operational bandwidth and speeding up the settling time of the low pass filter.

35. The method as described in claim 31 further comprising a step of adjusting the bandwidth of the filtering device without a capacitance change of the first capacitor.

36. The method as described in claim 31, wherein the first terminal is switched for the first node and the second node, and the first preset voltage level is a fixed voltage level.

37. The method as described in claim 31, further comprising a step of using a first single switch dedicated to selectively switch the first terminal of the first capacitor to the first node in the filtering device or to the second node having the first preset voltage level, according to the control signal.

* * * * *